Aug. 23, 1927.
S. H. McBRIDE
1,639,854
MEAT TENDERER
Filed Nov. 23, 1925
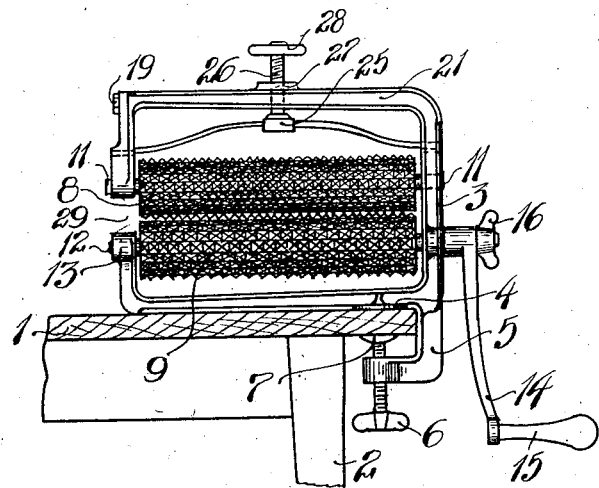
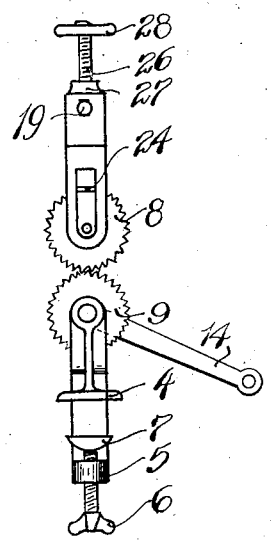
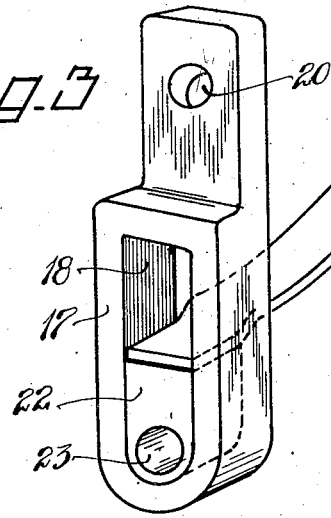
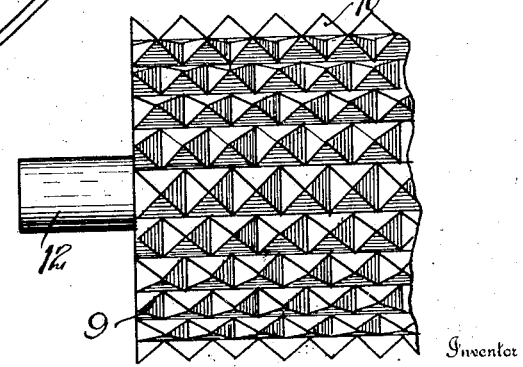
Inventor
Samuel H. McBride
By Herbert E. Smith
Attorney Patented Aug. 23, 1927.

1,639,854

UNITED STATES PATENT OFFICE.

SAMUEL H. McBRIDE, OF SILOAM SPRINGS, ARKANSAS.

MEAT TENDERER.

Application filed November 23, 1925. Serial No. 70,899.

My present invention relates to improvements in meat tenderers of the portable, manually operated type, designed for use in restaurants, homes and other places where it is necessary to treat steaks, chops, cuts, and other parts of meat, preparatory to frying, broiling or other culinary treatments.

The invention involves the utilization of a pair of rotary members or rolls between which the steak is passed and which are equipped with studded or corrugated surfaces for breaking the fibers of tough meat, and the device is provided with means which insure a resilient engagement of the rolls with the meat. The device is also fashioned in such manner as to provide for facile manipulation of the meat to prevent a bone or bones from coming between the rolls, as the meat is being treated. By the use of the device of my invention the entire steak, chop or cut may be manipulated for treatment between the rolls in order to insure the breaking down of all the fibers and thus provide a readily edible steak from an otherwise tough one.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in side elevation of a portable device embodying my invention and clamped on a table top ready for use.

Figure 2 is an edge view of the device, detached from the table, and as seen from the left in Figure 1.

Figure 3 is a detail perspective view of a portion of the frame of the device or implement illustrating one of the bearing blocks and its spring.

Figure 4 is an enlarged detail view of a portion of one of the studded or corrugated rolls.

In the preferred form of my invention as illustrated in the drawings the implement or device is exemplified as a portable, manually operated device which when in use may be attached to a convenient support as the table top 1 having usual legs one of which is illustrated at 2 in Figure 1 of the drawings.

The implement is designed to be clamped at one edge of the table top, and the frame 3 is fashioned with a clamping jaw 4 at its lower end or bottom adapted to rest on the table top. An integral interiorly threaded boss 5 is provided as an extension on the frame and a clamp screw 6 in this boss is fashioned with a clamp head 7 for co-action with the jaw 4 as indicated in Figure 1.

Two rolls 8 and 9 of similar size and shape are used between which the steak is to be passed and these rolls are each provided with studs 10 or other means on their exterior surfaces, for co-action on the upper and lower faces of the steak in breaking down the fibers of the meat as the rolls rotate.

The upper roll 8 has a shaft 11 and the lower roll 9 has a shaft 12, the latter journaled in fixed bearings 13 in the frame and adapted for use as the driving shaft. By means of a crank arm 14 and handle 15 the shaft may be turned by hand, and a set nut 16 is used on the threaded end of the shaft for clamping the crank arm on the shaft. These parts may readily be disconnected if desired for cleansing when required.

The upper roll is normally held in contact with the lower roll, but it may be elevated to permit insertion of a steak between the rolls and is then resiliently held to maintain the two rolls in operative position with relation to the steak as it is passed through the rolls when the crank handle is turned.

The frame is provided with a detachable bearing plate 17, which as shown in Figure 3 is slotted at 18, and a bolt 19 is passed through a bolt hole 20 and threaded into the top bar 21 of the main frame.

The main frame is provided with a slot complementary to the slot 18 and bearing block 22 is slidably supported in each of these slots. The bearing blocks have journal holes 23 for the end journals of the shaft 11, and these blocks are urged downwardly to maintain the relationship between the two rolls by means of a flat spring 24 located within the frame above the upper roll. At its center the spring is provided with a head 25 and an adjusting screw 26 which loosely engages this head is threaded in the boss 27 of the top bar 21.

The screw is provided with a hand wheel 28 which may be turned to adjust the tension of the spring and thus vary the resilient pressure on the bearing blocks 22 to either resist elevation of the upper roll as the steak is carried between the rolls, or to permit more freedom for entrance of the steak. The spring however is given the proper tension to cause the necessary engagement of the studded rolls with the surfaces of the steak to break down the fibers for the purpose described.

In Figure 1 it will be seen that a space 29 is provided in the frame between the bearings at one end thereof for the rolls, which space permits passage therethrough of a bone or bones in the meat. As the steak is held in the hand in proximity to this space the steak may be manipulated to prevent entrance of the bone between the rolls and yet at the same time permit the steak to be acted on by the rolls to break down the fibers over its entire surface.

If required the steak may be passed backwardly and forwardly through the rolls a number of times while grasped at one edge in the hand, and the driving roll 9 is turned to accomplish this movement, the idle roll 8 being caused to partake of the rotary movement because of the engagement of its studs with the upper surface of the meat.

Having thus fully described my invention, what I claim as new and desire to secure by Letters Patent is—

The combination with a rectangular frame having an open end, of parallel shafts and studded rolls on said shafts, the lower one of said shafts having stationary bearings and a crank arm, slidable bearing blocks for the ends of the upper shaft and guide slots in the frame for said blocks, a spring engaging the upper faces of said guide blocks, and a screw bar threaded in the frame and secured to the spring for varying the tension of said spring.

In testimony whereof I affix my signature.

SAMUEL H. McBRIDE